United States Patent [19]

Newburg, deceased

[11] Patent Number: 4,481,344
[45] Date of Patent: Nov. 6, 1984

[54] METHOD FOR MAKING THERMOSET POLY(DICYCLOPENTADIENE) AND THE PRODUCT SO PRODUCED

[75] Inventor: Norman R. Newburg, deceased, late of Wilmington, Del., by Betty Newburg, executrix

[73] Assignee: Hercules Incorporated, Wilmington, Del.

[21] Appl. No.: 526,836

[22] Filed: Aug. 26, 1983

[51] Int. Cl.$^3$ .............................................. C08F 32/06
[52] U.S. Cl. .................................. 526/283; 526/143; 526/144
[58] Field of Search ........................ 526/283, 143, 144

[56] References Cited

U.S. PATENT DOCUMENTS 3,816,384 6/1974 Streck et al. ........................ 526/144
4,400,340 8/1923 Klosieuicz ........................... 526/283

FOREIGN PATENT DOCUMENTS 53-111399 9/1978 Japan .

Primary Examiner—Paul R. Michl
Assistant Examiner—Alex H. Walher
Attorney, Agent, or Firm—Dale R. Lovercheck; Jeffrey F. Craft

[57] ABSTRACT

Disclosed is the incorporation into a two-part metathesis-catalyst system of a halogen containing hydrocarbyl additive, where the hydrocarbyl additive contains at least one trihalogen substituted atom or at least one activated halogen atom. The use of this catalyst system to polymerize dicyclopentadiene results in a thermoset polymer containing low levels of residual monomer. Also disclosed is a preferred embodiment of dicyclopentadiene polymerization where the two parts of the metathesis-catalyst system, plus dicyclopentadiene are combined in the mixing head of a reaction injection molding machine and then injected into a mold where the dicyclopentadiene rapidly sets up into a thermoset polymer.

4 Claims, No Drawings

METHOD FOR MAKING THERMOSET POLY(DICYCLOPENTADIENE) AND THE PRODUCT SO PRODUCED

BACKGROUND OF THE INVENTION

This invention relates to a method of making thermoset dicyclopentadiene (sometimes hereinafter referred to as DCPD) polymer and the product so produced. In particular, it relates to a method of polymerizing DCPD which involves the incorporation of a halogen containing hydrocarbyl additive into the catalyst system and the product so produced.

Thermoset poly(DCPD) is well suited for a wide variety of applications, particularly as an engineering plastic. The number of applications has been somewhat limited, however, because of the distinctive odor of the residual DCPD monomer. Consequently, there is a desire to reduce the level of residual monomer in the thermoset product.

One of the great advantages offered by poly(DCPD) is that it can be made via reaction injection molding (sometimes hereinafter referred to as RIM). Reaction injection molding is a process for in-mold polymerization which involves the mixing of two or more low viscosity reactant streams. The combined streams are then injected into a mold where they quickly set up into a solid infusible mass. For a particular catalyst system to be of use with RIM, certain requirements must be met:

(1) the individual reactant streams must be stable and must have a reasonable shelf-life under ambient conditions;

(2) it must be possible to mix the reactant streams thoroughly without their setting up in the mixing head;

(3) when injected into the mold, the materials must react rapidly to form a solid; and (4) any additives incorporated into the catalyst system must not interfere with the above requirements.

In addition to not adversely affecting the reaction it is desired that any additive actually serve to increase the reaction's efficiency such as making it possible to use less catalyst and making the catalyst system less sensitive to the ratio of activator to catalyst.

U.S. application Ser. No. 342,453, filed Jan. 25, 1982, now U.S. Pat. No. 4,400,340, discloses a thermoset poly(dicyclopentadiene) and a method for making the same. U.S. Pat. No. 3,816,384 discloses that the molecular weight of non-thermoset polyalkenamers, including poly(dicyclopentadiene), can be controlled by polymerizing in the presence of an ethylenically unsaturated halogenated hydrocarbon. Neither of these references discloses the synthesis of a thermoset poly(dicyclopentadiene) with a metathesis-catalyst system where the catalyst system has incorporated a halogen containing hydrocarbyl additive.

BRIEF DESCRIPTION OF THE PREFERRED EMBODIMENTS

All of the considerations discussed above are met when dicyclopentadiene is catalyzed with a two-part metathesis-catalyst system, the first part comprised of a metathesis-catalyst, the second part comprised of an activator and at least one part of which contains a halogen containing hydrocarbyl additive where the additive has at least one trihalogen substituted carbon atom or at least one activated halogen atom.

In a preferred embodiment, the two metathesis-catalyst parts, plus the monomer, form the basis for at least two separate streams which can be mixed in the head of a RIM machine and then injected into a mold where the monomer quickly sets up into a thermoset polymer.

DETAILED DESCRIPTION OF THE INVENTION

A metathesis-catalyst system polymerizes dicyclopentadiene in such a manner that the resulting product is a thermoset polymer having high impact strength and flexibility. The preferred monomer is commercially available endo-DCPD (3a,4,7,7a-tetrahydro-4,7-methano-1H-indene). The exoisomer, while not commercially available, can be used just as well.

In the preferred embodiment the thermoset polymer is formed entirely from DCPD monomer. In other embodiments the thermoset polymer is formed from DCPD monomer and from up to about 10% of another polycyclicpolyolefin monomer such as norbornadiene.

The polymerization of the DCPD is catalyzed by a two part metathesis-catalyst system. One part contains a tungsten containing catalyst, such as a tungsten halide or tungsten oxyhalide, preferably $WCl_6$ or $WOCl_4$. The other part contains an activator such as an alkylaluminum compound. The alkylaluminum compound can be a trialkylaluminum or an alkylaluminum dihalide or a dialkylaluminum halide where the alkyl group contains one to ten carbon atoms. In the preferred activators the alkyl group is ethyl.

One part of the catalyst system comprises the tungsten containing catalyst, as described above, preferably in solution with DCPD monomer. The tungsten compound if unmodified, will rapidly polymerize the monomer. In a preferred method of modifying the tungsten compound, a suspension is first made by adding the tungsten compound to a small amount of a suitable solvent. The solvent must not be susceptible to reacting with tungsten compound. Examples of preferred solvents are benzene, toluene, chlorobenzene, dichlorobenzene, trichlorobenzene and hexane. Sufficient solvent should be added so that the tungsten compound concentration is between about 0.1 and 0.7 mole per liter of solvent.

The tungsten compound is then made soluble in the suspension by the addition to the suspension a small amount of an alcoholic or a phenolic compound. Phenolic compounds are preferred. Suitable phenolic compounds include phenol, alkyl-phenols, and halogen containing phenols, with tert-butyl phenol, tert-octyl phenol and nonyl phenol being most preferred. The preferred molar ratio of tungsten compound/phenolic compound is from about 1:1 to about 1:3. The tungsten compound/phenolic compound solution can be made by adding the phenolic compound to the tungsten compound suspension, stirring the resulting solution and then blowing a stream of a dry inert gas through the solution to remove the hydrogen chloride which is formed. Alternatively, a phenolic salt, such as a lithium or sodium phenoxide, can be added to the tungsten compound suspension, the mixture stirred until essentially all the tungsten compound is dissolved, and the precipitated inorganic salt removed by filtration or centrifugation. All of these steps should be carried out in the absence of moisture and air to prevent deactivation of the catalyst.

Finally, from about 1 to about 5 moles of a Lewis base or a chelating agent per mole of tungsten compound is added to the tungsten compound solution. Preferred chelants include acetylacetones and alkyl acetoacetates, where the alkyl group contains from one to ten carbon atoms. Preferred Lewis bases include nitriles and ethers such as benzonitrile and tetrahydrofuran.

The improvement in the stability and shelf-life of the tungsten compound/monomer solution is obtained whether the complexing agent is added before or after the phenolic compound is added.

The other part of the metathesis-catalyst system comprises the activator, as described above, preferably in DCPD monomer. If an unmodified alkylaluminum activator/monomer solution is mixed with the catalyst/monomer solution, the polymerization would initiate instantaneously and the polymer would set up too rapidly. The onset of polymerization can be delayed by adding a moderator to the activator/monomer solution. Ethers, esters, ketones and nitriles are representative moderators for the alkylaluminum compounds. Ethyl benzoate and butyl ether are preferred. The preferred ratio of the alkylaluminum to moderator is from about 1:1.5 to about 1:5 on a molar basis.

The halogen containing hydrocarbyl additive incorporated into the metathesis-catalyst system must contain at least one trihalogen substituted carbon atom or at least one activated halogen atom. The preferred halogen atoms are chlorine and bromine. The hydrocarbyl backbone is composed of from about 1 to 14 carbon atoms and can be alkyl, alkenyl, or aromatic. Besides containing a halogen functionality the hydrocarbyl backbone may contain any other functionality, such as an ester or ketone functionality, which does not adversely effect the polymerization of the DCPD.

Examples of preferred halogen containing hydrocarbyl additives which contain at least one trihalogen substituted carbon atom include chloroform, carbon tetrachloride, 1,1,1-trichloro-ethane, hexachloropropene, hexachloroacetone, ethyl trichloroacetate, and alpha,alpha,alpha-trichlorotoluene. Ethyl trichloroacetate is the preferred halogen containing hydrocarbyl additive.

The meaning of "activated halogen atom" is known to those skilled in the art and refers to a halogen atom which is labile. Representative activated halogen atoms include those which are activated through their attachment to a carbon which is also attached to an electron with-drawing group such as a carbonyl, a vinyl bond, or a phenyl. Other activated halogen atoms are known. Representative halogen containing hydrocarbyl additives which contain activated halogens include allyl chloride, allyl bromide, benzyl chloride and hexachlorocyclopentadiene.

The halogen containing hydrocarbyl additive may be incorporated into either part or both parts of the metathesiscatalyst system, or it may be added to the DCPD separately. The preferred halogen containing hydrocarbyl additive, ethyl trichloroacetate is preferably incorporated into the tungsten containing part of the catalyst system. From about one-half to about four moles, preferably from about one to about two moles of halogen containing hydrocarbyl additive are added per mole of activator.

What is ultimately required is that when the catalyst system's components are combined, the resulting DCPD to tungsten compound ratio, on a molar basis, will be from about 1,000:1 to about 15,000:1, preferably about 6,000:1. The preferred ratio of 6,000:1 significantly differs from the preferred ratio of 2,000:1 used in catalyst systems which do not include a halogen containing hydrocarbyl additive. The lower amount of catalyst not only results in a cost savings but lower catalytic residue in the final product. It has been found that the lower amount of residue provides a polymer which has less color and is less corrosive than its non-additive containing counterpart.

Also, when the catalyst systems components are combined, the resulting activator to tungsten ratio will be from about 2:1 to about 20:1 preferably about 10:1. This means that the polymerization can be carried out with a greater excess of activator than is desirable with catalyst systems which do not include the halogen containing hydrocarbyl additive. In turn, this excess activator is available to scavenge impurities which may be present in the catalytic system and could otherwise deleteriously effect the polymerization and the product.

The exact amounts of catalyst, activator and halogen containing hydrocarbyl additive to be employed in a given catalyst system will depend on the particular catalyst, activator and halogen containing hydrocarbyl additive to be chosen. The amounts will be readily determinable by one skilled in the art without undue experimentation following the teachings of this specification.

In a preferred embodiment, the poly(DCPD) is made and molded with the RIM process. The two parts of the metathesis-catalyst system, at least one of which contains the halogen containing hydrocarbyl additive, are mixed with DCPD, to form two stable solutions which are placed in separate vessels. These vessels provide the source for separate streams. The two streams are combined in the RIM machine's mixing head and then injected into a warm mold where they quickly polymerize into a solid, infusible mass.

The invention is not intended to be limited to embodiments employing two streams each containing monomer and one containing the additive. It will be obvious to one skilled in the art that there may be situations where it is desirable to have monomer incorporated in just one stream or to employ a plurality of streams where the additional streams contain monomer or additives or both.

These streams are combined in the mixing head of a RIM machine. Turbulent mixing is easy to achieve because the process involves low molecular weight, rapidly diffusing components. Typically the mixing heads have orifices about 0.032 inch in diameter and a jet velocity of about 400 ft/sec. After being combined, the mixture is injected into a mold maintained at 35°–100° C., preferably 50°–70° C. The mold pressure is in the range of about 10–50 psi. A rapid exothermic reaction occurs as the poly(DCPD) sets up. The mold can be opened in as little as 20–30 seconds after the combined streams have been injected. In this short time heat removal is not complete and the polymer is hot and flexible. The polymer can be removed from the mold immediately while hot or after cooling. After the polymer has cooled it will become a rigid solid. The total cycle time may be as low as 0.5 minute. Post-curing is desirable but not essential, to bring the samples to their final stable dimensional states and to improve final physical properties. Post-curing at about 175° C. for about 15 minutes is usually sufficient.

It has been found that when the halogen containing hydrocarbyl additive is incorporated into the metathesis-catalyst system used to form the poly(DCPD) the amount of residual monomer in the final product is decreased.

In some embodiments, the reactant streams and consequently the final polymer also contain filler or preformed elastomers or both.

The invention is illustrated by the following examples but it is not to be limited thereby. All amounts are expressed in terms of moles or molarity unless otherwise clearly indicated.

EXAMPLES 1–26

These examples illustrate preferred embodiments of poly(DCPD) containing a variety of halogen containing hydrocarbyl additives in a variety of concentrations.

Preparation of Tungsten Solution 2.04 g of $WCl_6$ (5.16 mmole) is added to a dry centrifuge bottle in a nitrogen filled glove bag. The bottle is capped and sparged with nitrogen and then 48.5 ml of dried toluene is added. After stirring for 1 hour with a slow sparge, 1.44 ml (6.19 mmole) of dried nonylphenol is added. The resulting solution is stirred and sparged for 3.5 hours and 1.06 ml of dried acetylacetone is added. The solution is stirred overnight with a slow nitrogen sparge. Any lost toluene is added back. This solution is diluted with DCPD to a final 0.0071 M concentration.

Polymerization of DCPD

Examples 1–26 are run in 15 mm × 125 mm test tubes with rubber stoppers wired on the tops. Purified nitrogen is used to flush the tube for 15 minutes before the catalyst and activator parts are added by syringe. Halogen containing hydrocarbyl additive is dissolved in 2 ml of tungsten solution, prepared as outlined above, in each test tube. Thermocouples inside hypodermic needles are placed in the solutions in each test tube and to each test tube is added 2 ml of a 0.071 M $Et_2AlCl$/0.085 M n-butyl ether solution in DCPD. The mixtures are shaken to get a uniform mixture before the reaction can gel and exotherm. The halogen containing hydrocarbyl additive employed and the relative amounts of halogen containing hydrocarbyl additive, tungsten solution and activator solution, as well as the change in temperature and time to ½ exotherm are shown in Table I. The exotherm is an indication of the rate and completeness of the polymerization. The quicker the time until the exotherm the quicker the reaction and the greater the exotherm the greater the degree of polymerization.

EXAMPLES 27–30

This example illustrates the reduction in residual dicyclopentadiene monomer concentration when a halogen containing hydrocarbyl additive is incorporated into the metathesis catalyst system.

The procedure outlined for examples 1 through 26 is repeated in examples 27 through 30 and for a control. The particular additive incorporated into the catalyst system and the ratios of additive to catalyst and of activator to catalyst are shown in Table II. The amount of residual DCPD in the thermoset polymer is measured by extracting the poly(DCPD) with toluene and determining the amount of DCPD in the extract with gas chromatography. The results are shown in Table II.

TABLE I

| Example Number | Additive | Molar Ratio Additive/ DEAC | Molar Ratio Additive/ $WCl_6$ | DEAC/ $WCl_6$ | Exotherm T °C. | Time to ½ Exotherm (seconds) |
|---|---|---|---|---|---|---|
| Control | — | — | — | 10 | 124 | 37 |
| 1 | α,α,α-trichlorotoluene | 0.5 | 5 | 10 | 170 | 59 |
| 2 | α,α,α-trichlorotoluene | 1.0 | 5 | 5 | 176 | 64 |
| 3 | α,α,α-trichlorotoluene | 2.0 | 10 | 5 | 188 | 72 |
| 4 | α,α,α-trichlorotoluene | 4.0 | 20 | 5 | 193 | 64 |
| 5 | Chloroform | 0.88 | 8.8 | 10 | 138 | 43 |
| 6 | Chloroform | 3.5 | 35 | 10 | 158 | 54 |
| 7 | 1,1,1-trichloroethane | 2.8 | 28 | 10 | 166 | 81 |
| 8 | Hexachloropropene | 1.0 | 5 | 5 | 184 | 48 |
| 9 | Hexachloropropene | 4.0 | 20 | 5 | 186 | 49 |
| 10 | Hexachloropropene | 1.0 | 10 | 10 | 204 | 36 |
| 11 | Hexachloroacetone | 1.0 | 10 | 10 | 196 | 33 |
| 12 | Hexachloroacetone | 0.5 | 5 | 10 | 186 | 37 |
| 13 | Allyl Bromide | 1.0 | 10 | 10 | 178 | 65 |
| 14 | Allyl Bromide | 0.5 | 5 | 10 | 167 | 68 |
| 15 | Benzyl Chloride | 1.0 | 10 | 10 | 187 | 54 |
| 16 | Benzyl Chloride | 0.5 | 5 | 10 | 161 | 56 |
| 17 | Allyl Chloride | 1.0 | 10 | 10 | 189 | 57 |
| 18 | Allyl Chloride | 0.5 | 5 | 10 | 168 | 54 |
| 19 | Enthyltrichloroacetate | 0.5 | 5 | 10 | 161 | 39 |
| 20 | Enthyltrichloroacetate | 1.0 | 5 | 5 | 180 | 85 |
| 21 | Enthyltrichloroacetate | 2.0 | 10 | 5 | 180 | 85 |
| 22 | Enthyltrichloroacetate | 4.0 | 20 | 5 | 172 | 109 |
| 23 | Carbon Tetrachloride | 0.73 | 7.3 | 10 | 152 | 38 |
| 24 | Carbon Tetrachloride | 2.92 | 29.2 | 10 | 197 | 38 |
| 25 | Hexachlorocyclopentadiene | 0.87 | 4.4 | 5 | 178 | 75 |
| 26 | Hexachlorocyclopentadiene | 3.50 | 17.5 | 5 | 172 | 70 |

TABLE II

| Example | Modifier | Molar Ratio Modifier/W | Molar Ratio DEAC/W | Residual DCPD (% by wt.) |
|---|---|---|---|---|
| control | — | — | 10 | 10% |
| 27 | carbon tetrachloride | 22 | 10 | 0.07% |
| 28 | hexachloropropene | 20 | 10 | 0.01% |
| 29 | α,α,α-trichlorotoluene | 20 | 10 | 0.11% |
| 30 | ethyl trichloroacetate | 20 | 10 | 0.08% |

EXAMPLE 31

This example illustrates a preferred embodiment of the synthesis of poly(DCPD) via reaction injection molding where the catalyst system contains ethyl trichloroacetate.

Poly(DCPD) is made using a standard RIM machine manufactured by Accuratio Co. of Jeffersonville, Ind. Into two 2 gallon tanks is charged DCPD containing 6% by weight of a random styrene-butadiene rubber. The tanks are then closed and inerted with nitrogen. Sufficient $Et_2AlCl$ is transferred into one of the tanks to bring the $Et_2AlCl$ concentration to 0.071 M and sufficient di-n-butyl ether added to the same tank to achieve an ether to $Et_2AlCl$ ratio of 1.2:1. Next, to the other tank is added sufficient $WCl_6$/phenol catalyst prepared as outlined in Examples 1–26 to provide a 0.0071 M concentration and sufficient ethyl triacetate to provide a 0.624 M concentration. All transfers are done in a way to preclude the entrance of oxygen or moisture into the system. The materials are then thoroughly blended in their respective tanks.

The components of the two tanks are combined by a standard impingement type RIM mixhead. The ratio of the activator/monomer solution mixed with catalyst/monomer solution is 1:1. The impingement mixing is accomplished by passing both the solutions through orifices 0.032" in diameter at a flow rate approximately 80 ml/sec. This required pumping pressure of approximately 1000 psi.

The resulting mixture flows directly into a mold heated between 40° C. and 80° C. The mold is made out of chrome plated aluminum. The mold has a flat cavity which forms a plaque sample $10'' \times 10'' \times \frac{1}{8}''$ thick. A clamping force of 1.5 tons is used to keep the mold closed. The amount of residual monomer, determined by the method outlined for Examples 27–30, is 0.03% by weight based on the weight of the poly(DCPD).

What I claim and desire to protect by Letters Patent is:

1. In a method for making a thermoset polymer of polymerized units of dicyclopentadiene comprising: first, combining a plurality of reactant streams, one reactant stream containing the activator of a metathesis-catalyst system, a second reactant stream containing a catalyst of said metathesis-catalyst system, and of at least one reactant stream containing dicyclopentadiene, the improvement of adding to at least one reactant stream a halogen containing hydrocarbyl additive where the halogen containing hydrocarbyl additive contains at least one trihalogen substituted carbon atom or at least one activated halogen atom.

2. The method in accordance with claim 1, wherein the halogen containing hydrocarbyl additive is selected from the group consisting of chloroform, carbon tetrachloride, 1,1,1-trichloroethane, hexachloropropane, hexachloroacetone, ethyl trichloroacetate, alpha,alpha,alpha-trichlorotoluene, allyl chloride, allyl bromide, benzyl chloride and hexachlorocyclopentadiene.

3. The method in accordance with claim 1, wherein the halogen containing hydrocarbyl additive is ethyl trichloroacetate.

4. The method in accordance with claim 1, wherein the molar ratio of halogen containing hydrocarbyl additive to activator is from about 0.5:1 to about 4:1.

* * * * *

UNITED STATES PATENT AND TRADEMARK OFFICE
CERTIFICATE OF CORRECTION

PATENT NO. : 4,481,344
DATED : November 6, 1984
INVENTOR(S) : Norman R. Newburg

It is certified that error appears in the above-identified patent and that said Letters Patent are hereby corrected as shown below:

Col. 3, lines 54 and 55, " metathesiscatalyst " should read -- metathesis-catalyst --;

Col. 6, line 15, " metathesiscatalyst " should read -- metathesis-catalyst --.

Signed and Sealed this

Ninth Day of April 1985

[SEAL]

Attest:

DONALD J. QUIGG

Attesting Officer  Acting Commissioner of Patents and Trademarks